US011390559B2

(12) United States Patent
Jacquet et al.

(10) Patent No.: US 11,390,559 B2
(45) Date of Patent: Jul. 19, 2022

(54) MATERIAL COMPRISING A SUBSTRATE PROVIDED WITH A STACK OF THIN LAYERS HAVING THERMAL PROPERTIES

(71) Applicant: SAINT-GOBAIN GLASS FRANCE, Courbevoie (FR)

(72) Inventors: Paul Jacquet, Pantin (FR); Nisita Wanakule, Paris (FR); Cyril Jean, Paris (FR); Xavier Caillet, Fontenay Sous Bois (FR); Veronique Rondeau, Asnieres sur Seine (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/289,339

(22) PCT Filed: Oct. 23, 2019

(86) PCT No.: PCT/FR2019/052524
§ 371 (c)(1),
(2) Date: Apr. 28, 2021

(87) PCT Pub. No.: WO2020/089545
PCT Pub. Date: May 7, 2020

(65) Prior Publication Data
US 2021/0395138 A1 Dec. 23, 2021

(30) Foreign Application Priority Data
Oct. 30, 2018 (FR) .................................. 18 60048

(51) Int. Cl.
*B32B 7/02* (2019.01)
*C03C 17/36* (2006.01)

(52) U.S. Cl.
CPC ........ *C03C 17/3639* (2013.01); *C03C 17/366* (2013.01); *C03C 17/3618* (2013.01);
(Continued)

(58) Field of Classification Search
CPC ............ C03C 17/3639; C03C 17/3618; C03C 17/3626; C03C 17/3644; C03C 17/366; C03C 2218/156; B32B 7/02
See application file for complete search history.

(56) References Cited

U.S. PATENT DOCUMENTS

| 2014/0198389 A1 | 7/2014 | Laurent et al. |
| 2016/0124119 A1 | 5/2016 | Georges et al. |
| 2018/0194676 A1 | 7/2018 | Lorenzzi et al. |

FOREIGN PATENT DOCUMENTS

| EP | 2 661 417 A1 | 11/2013 |
| FR | 3 005 048 A1 | 10/2014 |

(Continued)

OTHER PUBLICATIONS

International Search Report dated Feb. 10, 2020 in PCT/FR2019/052524 filed Oct. 23, 2019, 2 pages

*Primary Examiner* — Lawrence D Ferguson
(74) *Attorney, Agent, or Firm* — Oblon, McClelland, Maier & Neustadt, L.L.P.

(57) ABSTRACT

A material includes a transparent substrate coated with a stack of thin layers successively including an alternation of three silver-based functional metal layers and of four dielectric coatings so that each functional metal layer is positioned between two dielectric coatings. Absorbent material is present between the first functional layer and the second functional layer, in a total thickness Abs2 such that $1.0 \leq Abs2 \leq 5.0$ nm and/or absorbent material is present between the second functional layer and the third functional layer, in a total thickness Abs3 such that $1.0 \leq Abs3 \leq 5.0$ nm. Additionally, absorbent material is present between the face of the substrate and the first functional layer in a total thickness such that $0.0 < Abs1 \leq 0.5$ nm and absorbent material is present above the third functional layer, in a total thickness Abs4 such that $0.0 < Abs4 \leq 0.5$ nm.

20 Claims, 1 Drawing Sheet

(52) U.S. Cl.
CPC ...... *C03C 17/3626* (2013.01); *C03C 17/3644* (2013.01); *C03C 2218/156* (2013.01)

(56) References Cited

FOREIGN PATENT DOCUMENTS

| | | |
|---|---|---|
| WO | WO 2017/006027 A1 | 1/2017 |
| WO | WO 2019/086784 A1 | 5/2019 |

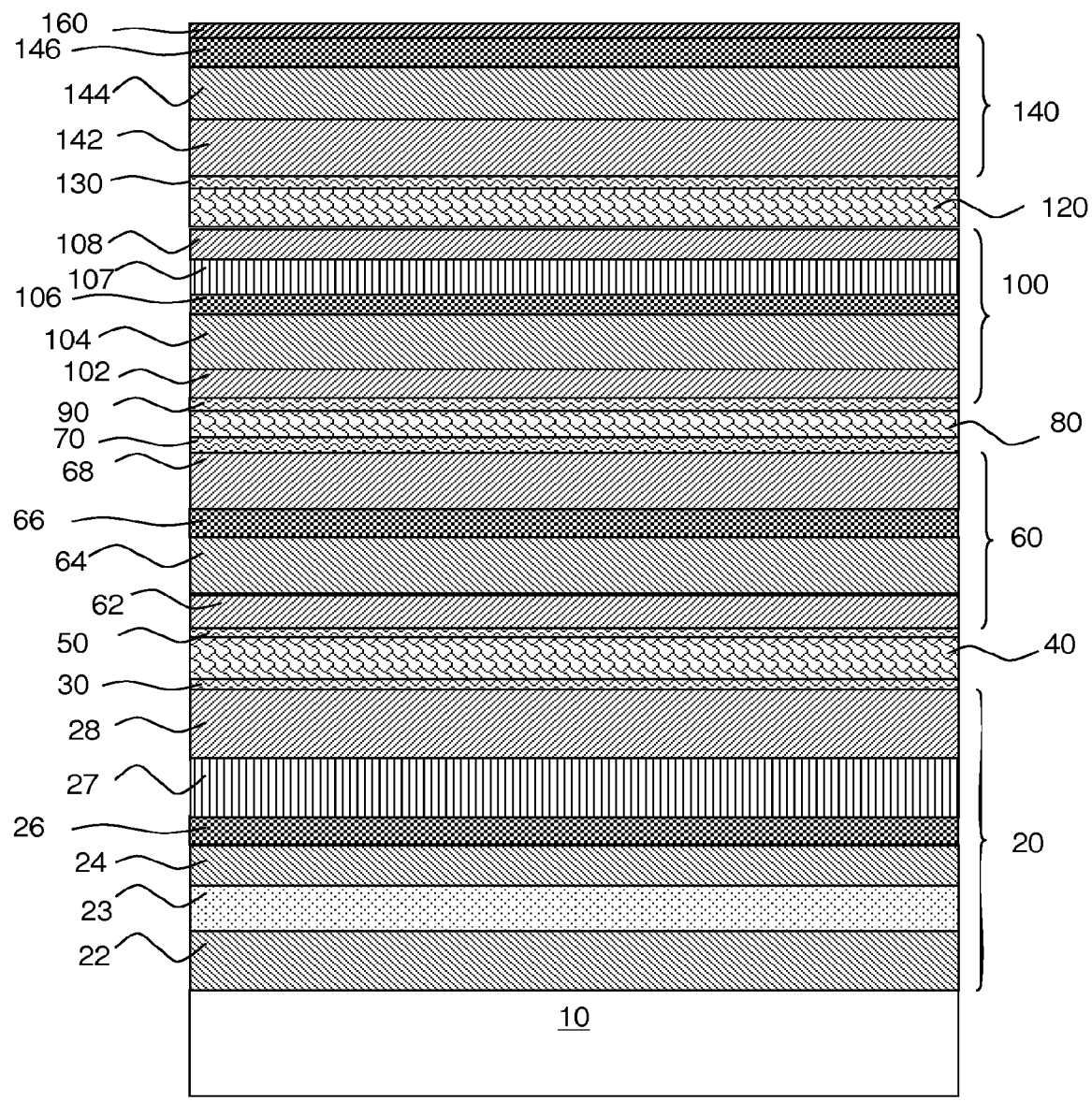

MATERIAL COMPRISING A SUBSTRATE PROVIDED WITH A STACK OF THIN LAYERS HAVING THERMAL PROPERTIES

The invention relates to a material, such as a glazing, comprising a transparent substrate coated with a stack of thin layers comprising several functional layers which can influence solar radiation and/or infrared radiation. The invention also relates to the glazings comprising these materials and also to the use of such materials for manufacturing thermal insulation and/or solar protection glazings.

These glazings may be intended to equip both buildings and vehicles, in particular with a view to reducing the air-conditioning load and/or preventing excessive overheating, which glazings are known as "solar control" glazings, and/or reducing the amount of energy dissipated toward the outside, which glazings are known as "low-e" glazings, driven by the ever-increasing importance of glazed surfaces in buildings and vehicle passenger compartments.

Depending on the climates of the countries where these glazings are installed, the desired performance in terms of light transmission and solar factor may vary within a certain range. The light transmission must be low enough to eliminate glare and high enough for the reduction in the amount of light penetrating inside the space delimited by said glazing not to make it necessary to use artificial light. For example, in countries with high levels of sunshine, there is a great demand for glazings having a light transmission of the order of 50%, for low solar factor values, typically of less than or equal to 30%, that is to say the selectivity of which is of the order of 1.8 or slightly greater for a double glazing and with the stack of thin layers on face 2.

Glazings comprising transparent substrates coated with a stack of thin layers comprising three functional metal layers, each positioned between two dielectric coatings, have been proposed in order to improve the solar protection while retaining a sufficient light transmission. These stacks are generally obtained by a series of depositions carried out by sputtering, optionally magnetron sputtering. These glazings are described as selective since they make it possible:

- to reduce the amount of solar energy penetrating inside buildings while having a low solar factor (SF or g),
- to guarantee a sufficient light transmission,
- to have a low emissivity in order to reduce the loss of heat by long-wavelength infrared radiation.

According to the invention:

- solar factor "g" is understood to mean the ratio, as a percentage, of the total energy entering the space through the glazing to the incident solar energy,
- selectivity "S" is understood to mean the ratio of the light transmission to the solar factor $T_L/g$.

Materials of the prior art make it possible to obtain light transmission, solar factor, external reflection and emissivity values within desired ranges. However, the esthetic appearance of glazings incorporating such materials is not entirely satisfactory and has in particular the following disadvantages: the external reflection is too low and/or the internal reflection is too high; the difference between the external reflection and the internal reflection is too low.

Thus, there is a need for glazings that have a low light transmission $T_L$ of the order of 50% (between 40.0% and 55.0%, including these values), with a high external reflection $R_e$, of the order of at least 27.0% (between 27.0% and 35.0%, including these values) and a low internal reflection $R_i$, of the order of 20.0% or less (between 5.0% and 20.0%, including these values), with a selectivity S≥1.5 or even S≥1.8 (in particular a selectivity of the order of 1.5 for a double glazing with a stack of thin layers on face 3 or a selectivity S of the order of 1.8 for a double glazing with a stack of thin layers on face 2).

One objective of the invention is to provide a material which meets, at least in part, these needs and, in a preferred version, all of these needs; in particular for a double glazing comprising a material according to the invention.

The complexity of the stacks comprising three functional layers makes combined improvement of these optical characteristics difficult without adversely affecting the solar control performance.

A similar technical problem has already been touched on in international patent application no. WO 2017/006029 A1. A description is given therein of a stack comprising three functional layers made of silver, the double glazing incorporating this stack having a high light transmission, of the order of 70%, and a solar factor of the order of 34%, the selectivity being of the order of 2. According to the teaching of this publication, each dielectric coating comprises at least one high-index dielectric layer, the refractive index of which is at least 2.15 and the optical thickness of which is greater than 20 nm.

International patent application no. WO 2011/147875 for its part describes stacks comprising three functional layers made of silver in which the second functional layer has a physical (geometrical) thickness which is lower than that of the other functional layers. However, this patent application does not describe glazings that have the desired optical properties, as explained above.

Known from the prior art, in particular from international patent application no. WO 2014/125083, are examples of materials having three functional metal layers, in particular examples 11 and 53 of this document, with absorbent material solely between the first functional metal layer and the second functional metal layer. These examples exhibit, once mounted in double glazing, a high selectivity of the order of 1.9 and a low light transmission of the order of 51% (cf. table 8 of this document); the internal reflection is also low, of the order of 10% to 11%, but the external reflection is much too low since it is less than 10%.

The inventors have surprisingly discovered that by selecting particular thicknesses of absorbent layers within the stack, it was possible to produce a glazing having both a high external reflection and a low internal reflection, with a marked difference between the external reflection and the internal reflection, of the order of 10% (between 8% and 12%).

The present invention is based on the use of a stack having at least three functional metal layers (indeed even of a stack having exactly three functional metal layers), which has a relatively large thickness of absorbent layer between the first and second functional metal layers and/or between the second and third functional metal layers, but which has a relatively small thickness of absorbent layer between the face of the substrate and the first functional metal layer and above the last functional metal layer.

A first subject of the invention is a material comprising a transparent substrate coated on one face with a stack of thin layers as claimed in claim 1. This stack successively comprises, starting from said face, an alternation:

- of three silver-based functional metal layers denoted, starting from the substrate, first functional layer Ag1, second functional layer Ag2 and third functional layer Ag3, with physical thicknesses respectively Ea1, Ea2 and Ea3, and
- of four dielectric coatings denoted, starting from said face of the substrate, M1, M2, M3 and M4, with optical thicknesses respectively Eo1, Eo2, Eo3 and Eo4, each dielectric coating comprising a dielectric layer or a dielectric assembly of layers, so that each functional metal layer is positioned between two dielectric coatings, said material being noteworthy in that:

absorbent material is present between said first functional layer Ag1 and said second functional layer Ag2, in a total thickness Abs2 such that $1.0 \leq Abs2 \leq 5.0$ nm and/or absorbent material is present between said second functional layer Ag2 and said third functional layer Ag3, in a total thickness Abs3 such that $1.0 \leq Abs3 \leq 5.0$ nm;

absorbent material is present between said face of the substrate and said first functional layer Ag1 in a total thickness Abs1 such that $0.0 < Abs1 \leq 0.5$ nm and absorbent material is present above said third functional layer Ag3, in a total thickness Abs4 such that $0.0 < Abs4 \leq 0.5$ nm.

Thus, absorbent material is present in a relatively large thickness between the first and the second functional layers and/or between the second and the third functional layers whereas it is present in a relatively small thickness below the first functional layer and above the third functional layer; it is this particular distribution of the absorbent material which makes it possible to obtain a glazing simultaneously having a low light transmission of the order of 50%, a high external reflection $R_e$ of the order of at least 27% and a low internal reflection $R_i$ of the order of 20% or less.

In a variant, when the absorbent material is present between said first functional layer Ag1 and said second functional layer Ag2, in a total thickness Abs2 such that $1.0 \leq Abs2 \leq 5.0$ nm then the absorbent material which is present between said second functional layer Ag2 and said third functional layer Ag3 may be such that $0.0 < Abs3 < 1.0$ nm.

In another variant, when the absorbent material is present between said second functional layer Ag2 and said third functional layer Ag3, in a total thickness Abs3 such that $1.0 \leq Abs3 \leq 5.0$ nm then the absorbent material which is present between said first functional layer Ag1 and said second functional layer Ag2 may be such that $0.0 < Abs2 < 1.0$ nm.

Preferably, the absorbent material which is present between said face of the substrate and said first functional layer Ag1 is such that $0.0 < Abs1$ s $0.3$ nm.

Preferably, the absorbent material which is present above said third functional layer Ag3 is such that $0.0 < Abs4 \leq 0.3$ nm.

A "coating" should be understood in the present invention to mean that there may be a single layer or several layers of different materials within the coating. A "dielectric coating" should therefore be understood to mean that there may be a single dielectric layer or several dielectric layers of different materials within the dielectric coating.

As is customary, a "dielectric layer" should be understood in the present invention to mean that, from the point of view of its nature, the material is "nonmetallic", i.e. is not a metal. In the context of the invention, this term denotes a material having an n/k ratio at the customary visible wavelength value of 550 nm which is equal to or greater than 5.0.

An "absorbent material" should be understood in the present invention to mean that a layer of absorbent material, or that each layer of absorbent material, in the location considered, is a material having an n/k ratio at the customary visible wavelength value of 550 nm which is between 0.0 and 5.0 excluding these values and excluding that the material constituting the layer in question is based on silver (since the layer in question cannot be a functional metal layer within the meaning of the invention).

It is recalled that n denotes the real refractive index of the material at a given wavelength and k represents the imaginary part of the refractive index at a given wavelength; the n/k ratio is calculated here at the same given wavelength for n and for k of 550 nm.

The absorbent material may be chosen from: an alloy in the metallic state comprising nickel and chromium or even an alloy in the metallic state of nickel and chromium, a nitride comprising nickel and chromium or even a nickel chromium nitride, a titanium nitride, niobium nitride, a nitride comprising zinc and tin or even a zinc tin nitride.

A "metallic absorbent material" or "absorbent material in the metallic state" should be understood in the present invention to mean that the material is absorbent as indicated above and that it does not comprise any oxygen atom or nitrogen atom.

The invention thus makes it possible to achieve the optical performance, thermal performance, transparency and esthetic appearance that are desired, as explained above.

By adjusting the thicknesses of the absorbent layers as indicated, the transparency of the glazing may be controlled so as to obtain light transmission $T_L$ values of the order of 50%, which range is very particularly suitable for glazings intended to be used in high-sunshine regions. According to a major advantage of the invention, the obtaining of the visual appearance is satisfactory with a relatively high external reflection and a relatively low internal reflection.

Certain preferred but nonlimiting embodiments of the present invention are given below, alternatively or cumulatively:

the physical thicknesses Ea1 and Ea2 respectively of said first and said second functional layers Ag1, Ag2 are each between 7.0 and 12.0 nm and the physical thickness Ea3 of said third functional layer Ag3 is between 13.0 and 16.0 nm;

said absorbent material present between said first functional layer Ag1 and said second functional layer Ag2 is present in contact with said functional layer Ag2, with at least half, and preferably all, of said total thickness Abs2 in contact with said functional layer Ag2; this possibility is particular advantageous since it is simpler to provide a thick blocking layer than to provide an additional absorbent layer within a dielectric coating;

said absorbent material present between said second functional layer Ag2 and said third functional layer Ag3 is present in contact with said functional layer Ag2, with at least half, and preferably all, of said total thickness Abs3 located in contact with said functional layer Ag2; this possibility is particular advantageous since it is simpler to provide a thick blocking layer than to provide an additional absorbent layer within a dielectric coating;

said first dielectric coating M1, and preferably only this first dielectric coating M1, comprises a high-index layer, having a refractive index at 550 nm which is at least 2.15, and having an optical thickness $Eo_{12}$ between 10.0 and 40.0 nm;

said first dielectric coating M1 has an optical thickness Eo1 between 130.0 and 160.0 nm;

said second dielectric coating M2 has an optical thickness Eo2 between 80.0 and 100.0 nm;

said third dielectric coating M3 has an optical thickness Eo3 between 140.0 and 180.0 nm;

said fourth dielectric coating M4 has an optical thickness Eo4 between 50.0 and 90.0 nm;

the ratio of the optical thickness Eo2 of said second dielectric coating M2 to the optical thickness Eo1 of said first dielectric coating M1 is, on the one hand, equal to or greater than 0.4 and, on the other hand, less than or equal to 0.9;

the ratio of the optical thickness Eo1 of said first dielectric coating M1 to the optical thickness Eo4 of said fourth dielectric coating M4 is greater than 1.5, or even greater than 1.8, or even greater than 2.0; this relatively low optical thickness Eo4 of said fourth dielectric coating M4 compared to the optical thickness Eo1 of said first dielectric coating is particularly advantageous for obtaining an external reflection of the glazing which is high;

the ratio of the optical thickness Eo3 of said third dielectric coating M3 to the optical thickness Eo1 of said first dielectric coating M1 is between 0.9 and 1.1.

The stack of thin layers may successively comprise, starting from said face, an alternation:

of only three silver-based functional metal layers denoted, starting from the substrate first functional layer Ag1, second functional layer Ag2 and third functional layer Ag3, with physical thicknesses respectively Ea1, Ea2, Ea3, and of only four dielectric coatings denoted, starting from said face of the substrate, M1, M2, M3 and M4, with optical thicknesses respectively Eo1, Eo2, Eo3, Eo4, each dielectric coating comprising a dielectric layer or a dielectric assembly of layers, so that each functional metal layer is positioned between two dielectric coatings.

Said three silver-based functional metal layers may be functional metal layers made of silver.

The stack may comprise, or consist of, starting from the transparent substrate:

a first dielectric coating M1 preferably comprising at least one dielectric layer having a barrier function and one dielectric layer having a stabilizing function, optionally a blocking layer, a first functional layer Ag1, optionally a blocking layer, a second dielectric coating M2 preferably comprising at least one lower dielectric layer having a stabilizing function, one dielectric layer having a barrier function and one upper dielectric layer having a stabilizing function, optionally a blocking layer, a second functional layer Ag2, optionally a blocking layer, a third dielectric coating M3 preferably comprising at least one lower dielectric layer having a stabilizing function, one dielectric layer having a barrier function and one upper dielectric layer having a stabilizing function, optionally a blocking layer, a third functional layer Ag3, optionally a blocking layer, a fourth dielectric coating M4 preferably comprising at least one dielectric layer having a stabilizing function, one dielectric layer having a barrier function and optionally one protective layer.

The invention further relates to a glazing comprising at least one material as described above. Such a glazing may be in the form of a monolithic, laminated or multiple glazing and in particular a double glazing or a triple glazing.

A dielectric coating within the meaning of the invention may comprise one, or even several, metal or nitride absorbing layer(s); however, this layer cannot constitute a silver-based functional metal as the latter is of "reflecting" and not "absorbing" type All the light characteristics presented in the description are obtained according to the principles and methods described in the European standard EN 410 relating to the determination of the light and solar characteristics of the glazings used in the glass for the construction industry.

Conventionally, the refractive indices are measured at a wavelength of 550 nm. The light transmission $T_L$ and light reflection $R_L$ factors are measured under the illuminant D65 with a field of vision of 2°.

Unless otherwise indicated, all the values and ranges of values for the optical and thermal characteristics are given for a double glazing consisting of clear substrates of ordinary soda-lime glass type, including a first 6-mm substrate, bearing the stack of thin layers, of a 16-mm interlayer space filled with argon in a proportion of 90% and with air in a proportion of 10%, and of another uncoated substrate, which is also clear, of soda-lime glass type with a thickness of 4 mm. The first coated substrate is placed in the double glazing so that the stack of thin layers is on face 2 of said glazing. The external light reflection $R_{Lext}$, or $R_e$, of the double glazing is measured on the side of the first substrate, while the reflection $R_{Lint}$, or Ri, of the double glazing is measured on the side of the second substrate (not comprising a stack).

Unless otherwise mentioned, the thicknesses mentioned in the present document, without any further information, are physical, or else real or geometrical, thicknesses denoted Ep and are expressed in nanometers. In contrast, an optical thickness Eo of a layer or of an assembly of layers is defined as the physical thickness of the layer under consideration multiplied by its refractive index (n) at the wavelength of 550 nm: $Eo=n_{550} \times Ep$. As the refractive index is a dimensionless value, it may be considered that the unit of the optical thickness is the same as that chosen for the physical thickness. In the present description, the unit chosen for the thicknesses is the nanometer, unless otherwise indicated. If a dielectric coating is composed of several dielectric layers, the optical thickness of the dielectric coating corresponds to the sum of the optical thicknesses of the various dielectric layers constituting the dielectric coating.

Throughout the description, the substrate according to the invention is regarded as being positioned horizontally. The stack of thin layers is deposited above and in contact with the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one (or more) layer(s) inserted between these two layers (or layer and coating).

Within the meaning of the present invention, the labels "first", "second", "third" and "fourth" for the functional layers or the dielectric coatings are defined starting from the substrate bearing the stack and with reference to the layers or coatings having the same function. For example, the functional layer closest to the substrate is the first functional layer, the next moving away from the substrate is the second functional layer, and so on.

As indicated above, the invention also relates to a glazing comprising a material according to the invention. Conventionally, the faces of a glazing are denoted from the outside of the building and by numbering the faces of the substrates from the outside toward the inside of the passenger compartment or premises equipped with it. This means that the incident sunlight passes through the faces in increasing numerical order thereof.

The stack is preferably positioned in the glazing so that the incident light originating from the outside passes through the first dielectric coating before passing through the first functional metal layer. The stack is not deposited on the face of the substrate defining the exterior wall of the glazing but on the interior face of this substrate. The stack is thus advantageously positioned on face 2, face 1 of the glazing being the outermost face of the glazing, as usual.

By choosing to fit the glazing in this way, the first dielectric coating (M1) is located between the outside and all the silver-based functional layers of the stack.

Preferably, the stack is deposited by magnetron sputtering (magnetron process). According to this advantageous embodiment, all the layers of the stack are deposited by magnetron sputtering.

The invention also relates to the process for obtaining a material according to the invention, in which the layers of the stack are deposited by magnetron sputtering.

The silver-based functional metal layers comprise at least 95.0%, preferably at least 96.5% and better still at least 98.0% by weight of silver, with respect to the weight of the functional layer. The silver-based metal functional layer preferably comprises less than 1.0% by weight of metals other than silver, with respect to the weight of the silver-based metal functional layer.

The stack may further comprise at least one upper protective layer, in particular based on TiZr (that is to say, comprising Ti and Zr) and in particular based on TiZrO or based on TiZrN, or based on SnZnO or on $TiO_2$.

Blocking layers may be present in the stack according to the invention. They conventionally have the role of protecting the functional layers from possible damage during the deposition of the upper antireflective coating and/or during a possible high-temperature heat treatment of the annealing, bending and/or tempering type.

The blocking layers are chosen, for example, from metal layers based on a metal or on a metal alloy, metal nitride layers, metal oxide layers and metal oxynitride layers of one or more elements chosen from titanium, nickel, chromium and niobium, such as Ti, TiN, $TiO_x$, Nb, NbN, Ni, NiN, Cr, CrN, NiCr or NiCrN or else $NbNO_x$ or $NiCrO_x$.

The geometrical thickness of such layers is of the order of a few nanometers, generally less than 7 nanometers and when a blocking layer is thin, this thickness is often less than a nanometer whereas when a blocking layer is thick, this thickness at least a nanometer and even of the order of 1.5 to 4.5 nanometers.

When these blocking layers are deposited in the metal, nitride or oxynitride form, these layers can undergo a partial or complete oxidation depending on their thickness and the nature of the layers which frame them, for example, during the deposition of the following layer or by oxidation in contact with the underlying layer.

The blocking layer(s) may be considered to be in the absorbent material, the distribution of which constitutes the basis of the invention as a function of the element(s) of the materials constituting the blocking layer(s) and as a function of the n/k ratio of the material constituting the blocking layer(s); for a blocking layer, if the material which constitutes it has an n/K ratio at the wavelength of 550 nm between 0.0 and 5.0 excluding these values, then this blocking layer is considered to be in the absorbent material according to the invention.

Furthermore, the blocking layer or layers may satisfy one or more of the following conditions:
  each functional metal layer is in contact with at least one blocking layer chosen from a blocking underlayer and a blocking overlayer, and/or
  the thickness of each thin blocking layer is at least 0.1 nm but less than 1.0 nanometer, preferably between 0.1 and 0.9 nm, and/or
  the thickness of each thick blocking layer is at least 1.0 nm but less than or equal to 5.0 nanometers.

It is possible for the total thickness of all the blocking layers in contact with the functional layers to be between 3.5 and 8.0 nm including these values.

According to advantageous embodiments of the invention, the dielectric coatings satisfy one or more of the following conditions:
  the dielectric coatings comprise at least one dielectric layer based on an oxide or on a nitride of one or more elements chosen from silicon, titanium, zirconium, aluminum, tin or zinc, and/or
  at least one dielectric coating comprises at least one dielectric layer having a barrier function, and/or
  each of the dielectric coatings comprises at least one dielectric layer having a barrier function, and/or
  the dielectric layers having a barrier function are based on compounds of silicon and/or of aluminum chosen from oxides, such as $SiO_2$ and $Al_2O_3$ or their mixture, silicon nitrides $Si_3N_4$ and AlN or their mixture, and oxynitrides $SiO_xN_y$ and $AlO_xN_y$ or their mixture, or else based on mixed zirconium aluminum nitride, or else based on titanium dioxide, and/or
  the dielectric layers having a barrier function are based on compounds of silicon and/or of aluminum optionally comprise at least one other element, such as aluminum, hafnium and zirconium, and/or
  at least one dielectric coating comprises at least one dielectric layer having a stabilizing function, and/or
  each dielectric coating comprises at least one dielectric layer having a stabilizing function, and/or
  the dielectric layers having a stabilizing function are preferably based on an oxide chosen from zinc oxide, tin oxide, zirconium oxide or a mixture of at least two of them,
  the dielectric layers having a stabilizing function are preferably based on crystalline oxide, in particular based on zinc oxide, optionally doped using at least one other element, such as aluminum, and/or
  each functional layer is above a dielectric coating, the upper layer of which is a dielectric layer having a stabilizing function, preferably based on zinc oxide, and/or below a dielectric coating, the lower layer of which is a dielectric layer having a stabilizing function, preferably based on zinc oxide.

Preferably, each dielectric coating consists solely of one or more dielectric layers. Preferably, there is thus no absorbent layer in the dielectric coatings, in order not to reduce the light transmission.

The stacks of the invention can comprise dielectric layers having a barrier function. The term "dielectric layers having a barrier function" is understood to mean a layer made of a material capable of forming a barrier to the diffusion of oxygen and water at high temperature, originating from the ambient atmosphere or from the transparent substrate, toward the functional layer. The constituent materials of the dielectric layer having a barrier function thus must not undergo chemical or structural modification at high temperature which would result in a modification of their optical properties. The layer or layers having a barrier function are preferably also chosen such that they are made of a material capable of forming a barrier to the constituent material of the functional layer. The dielectric layers having a barrier function thus make it possible for the stack to undergo, without excessively great optical change, heat treatments of the annealing, tempering or bending type.

The stacks of the invention may comprise dielectric layers having a stabilizing function. Within the meaning of the invention, "stabilizing" means that the nature of the layer is selected so as to stabilize the interface between the functional layer and this layer. This stabilization results in the strengthening of the adhesion of the functional layer to the layers which frame it and, in fact, it will oppose the migration of its constituent material.

The dielectric layer or layers having a stabilizing function can be found directly in contact with a functional layer or separated by a blocking layer.

Preferably, the final dielectric layer of each dielectric coating located below a functional layer is a dielectric layer having a stabilizing function. This is because it is advantageous to have a layer having a stabilizing function, for example based on zinc oxide, below a functional layer as it facilitates the adhesion and the crystallization of the silver-based functional layer and increases its quality and its stability at high temperature.

It is also advantageous to have a layer having a stabilizing function, for example based on zinc oxide, above a functional layer in order to increase the adhesion thereof and to optimally oppose the diffusion on the side of the stack opposite the substrate.

The dielectric layer or layers having a stabilizing function can thus be found above and/or below at least one functional layer or each functional layer, either directly in contact therewith or separated by a blocking layer.

Advantageously, each dielectric layer having a barrier function is separated from a functional layer by at least one dielectric layer having a stabilizing function.

This dielectric layer having a stabilizing function can have a thickness of at least 4 nm, in particular a thickness of between 4 and 20 nm and better still of 8 to 15 nm.

The stack of thin layers can optionally comprise a protective layer. The protective layer is preferably the final layer of the stack, that is to say the layer furthest from the substrate coated with the stack. These upper protective layers are regarded as included in the fourth dielectric coating. These layers generally have a thickness of between 2 and 10 nm, preferably 2 and 5 nm. This protective layer can be chosen from a layer of titanium, of zirconium, of hafnium, of zinc and/or of tin, this or these metals being in the metal, oxide, nitride or oxynitride form.

The protective layer can, for example, be chosen from a layer of titanium oxide, a layer of zinc tin oxide or a layer of titanium zirconium oxide.

A particularly advantageous embodiment relates to a substrate coated with a stack, defined starting from the transparent substrate, comprising:
 a first dielectric coating preferably comprising at least one dielectric layer having a barrier function and one dielectric layer having a stabilizing function,
 optionally a blocking layer,
 a first functional layer,
 optionally a blocking layer,
 a second dielectric coating preferably comprising at least one lower dielectric layer having a stabilizing function, one dielectric layer having a barrier function and one upper dielectric layer having a stabilizing function,
 optionally a blocking layer,
 a second functional layer,
 optionally a blocking layer,
 a third dielectric coating preferably comprising at least one lower dielectric layer having a stabilizing function, one dielectric layer having a barrier function and one upper dielectric layer having a stabilizing function,
 optionally a blocking layer,
 a third functional layer,
 optionally a blocking layer,
 a fourth dielectric coating preferably comprising at least one dielectric layer having a stabilizing function and one dielectric layer having a barrier function and optionally one protective layer.

According to other possible and advantageous embodiments of the present invention:
 Each dielectric coating below a functional layer comprises a final stabilizing layer based on crystalline zinc oxide, which is in contact with the functional layer deposited immediately above.
 Each dielectric coating above a functional layer comprises a first stabilizing layer based on crystalline zinc oxide, which is in contact with the functional layer deposited immediately above.
 Each dielectric coating comprises a dielectric layer having a barrier function based on silicon nitride, doped with aluminum, referred to here as $Si_3N_4$.
 Each functional metal layer is below and in contact with a blocking layer.
 The stack further comprises a protective layer made of TiZr or of titanium zirconium oxide with a thickness of less than 5 nanometers.

The transparent substrates according to the invention are preferably made of a rigid inorganic material, such as made of glass, or are organic, based on polymers (or made of polymer).

The transparent organic substrates according to the invention which are rigid or flexible, may also be made of polymer. Examples of polymers suitable according to the invention comprise in particular:
 polyethylene;
 polyesters, such as polyethylene terephthalate (PET), polybutylene terephthalate (PBT) or polyethylene naphthalate (PEN);
 polyacrylates, such as polymethyl methacrylate (PMMA);
 polycarbonates;
 polyurethanes;
 polyamides;
 polyimides;
 fluoropolymers, for instance fluoroesters, such as ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
 photocrosslinkable and/or photopolymerizable resins, such as thiolene, polyurethane, urethane-acrylate or polyester-acrylate resins; and
 polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

The substrate advantageously has at least one dimension greater than or equal to 1 m, or even 2 m and even 3 m in one direction, or in two perpendicular directions. The thickness of the substrate generally varies between 0.5 mm and 19 mm, preferably between 2 and 12 mm, in particular between 4 and 10 mm, or even between 4 and 8 mm. The substrate can be flat or bent, or even flexible.

The material, that is to say the substrate coated with the stack, can undergo a high-temperature heat treatment, such as an annealing, for example by a flash annealing, such as a laser or flame annealing, a tempering and/or a bending. The temperature of the heat treatment is greater than 400° C., preferably greater than 450° C. and better still greater than 500° C. The substrate coated with the stack can thus be bent and/or tempered.

The glazing of the invention can be in the form of a monolithic, laminated or multiple glazing, in particular a double glazing or a triple glazing.

In the case of a monolithic or multiple glazing, the stack is preferably deposited on face 2, that is to say that it is found on the substrate defining the exterior wall of the glazing and more specifically on the interior face of this substrate.

A monolithic glazing comprises 2 faces; the face 1 is outside the building and thus constitutes the exterior wall of the glazing and the face 2 is inside the building and thus constitutes the interior wall of the glazing.

A multiple glazing comprises at least two substrates held at a distance so as to delimit a cavity filled with an insulating gas. The materials according to the invention are very particularly suitable when they are used in double glazings having enhanced thermal insulation (ETI).

A double glazing comprises 4 faces; the face 1 is outside the building and thus constitutes the exterior wall of the glazing and the face 4 is inside the building and thus constitutes the interior wall of the glazing, the faces 2 and 3 being inside the double glazing.

In the same way, a triple glazing comprises 6 faces; the face 1 is outside the building (exterior wall of the glazing), the face 6 is inside the building (interior wall of the glazing) and the faces 2 to 5 are inside the triple glazing.

A laminated glazing comprises at least one structure of first substrate/sheet(s)/second substrate type. The stack of thin layers is positioned on one at least of the faces of one of the substrates. The stack can be on the face of the second substrate not in contact with the sheet, preferably polymer. This embodiment is advantageous when the laminated glazing is fitted in a double glazing with a third substrate.

The glazing according to the invention, used as monolithic glazing or in a multiple glazing of double glazing type, exhibits colors in external reflection which are neutral, pleasant and subdued, within the range of the blues or blue-greens (in particular colors, the dominant wavelength of which is of the order of 450 to 500 nanometers). Furthermore, this visual appearance remains virtually unchanged whatever the angle of incidence with which the glazing is observed (normal incidence and incidence under an angle). This means that an observer does not have the impression of a significant lack of uniformity in hue or in appearance.

The term "color in the blue-green range" should be understood as meaning, within the meaning of the present invention, that, in the L*a*b* color measurement system, a* is between −10.0 and 0.0 and b* is between −10.0 and 0.0.

The glazing of the invention preferably exhibits colors in transmission at normal incidence (0°) in the L*a*b* color measurement system with a* being negative, preferably between −10.0 and 0.0, more preferably between −5.0 and 0.0, and a b* value which is close to zero.

The glazing of the invention preferably exhibits colors in reflection on the external side at normal incidence (0°) in the L*a*b* color measurement system:
$a^*_{Re}$ between −5.0 and 0.0, and
$b^*_{Re}$ is between −8.0 and −0.0.

According to advantageous embodiments, the glazing of the invention, in the form of a double glazing comprising the stack positioned preferably on face 2, makes it possible in particular to achieve the following performance qualities:

a low light transmission $T_L$ of the order of 50% (between 40.0% and 55.0%, including these values; or even between 42.0% and 52.0%), a high external reflection $R_e$, of the order of at least 27% (between 27.0% and 35.0%, including these values) and a low internal reflection $R_i$, of the order of 20% or less (between 5.0% and 20.0%, including these values).

The details and advantageous characteristics of the invention emerge from the following nonlimiting examples, illustrated by means of the appended FIG. 1. In this FIGURE, the proportions between the various components are not respected in order to make the FIGURE easier to read.

FIG. 1 illustrates a stack structure according to the invention comprising only three functional metal layers 40, 80, 120, this structure being deposited on a transparent glass substrate 10. Each functional layer 40, 80, 120 is positioned between two dielectric coatings 20, 60, 100, 140 so that:

the first functional layer 40 (or "Ag1") is positioned between a first dielectric coating 20 (or "M1") and a second dielectric coating 60 (or "M2"), the second functional layer 80 (or "Ag2") is positioned between the second dielectric coating 60 (or "M2") and a third dielectric coating 100 (or "M3") and the third functional layer 120 (or "Ag3") is positioned between the third dielectric coating 100 (or "M3") and a fourth, or final, dielectric coating 140 (or "M4").

These dielectric coatings 20, 60, 100, 140 each comprise at least one dielectric layer 22, 23, 24, 27, 28; 62, 64, 68; 102, 104, 107, 108; 142, 144.

The stack may also comprise:
blocking underlayers 30, 70 located in contact with a functional layer,
blocking overlayers 50, 90 and 130 located in contact with a functional layer,
a protective layer 160, for example made of TiZr or of titanium zirconium oxide.

EXAMPLES

Stacks of thin layers defined below are deposited on substrates made of clear soda-lime glass with a thickness of 6 mm.

In the examples:
the functional layers 40, 80 and 120 are silver ("Ag") layers,
the blocking layers 30, 50, 70, 90 and 130 are metal layers made of an alloy of nickel and of chromium ("NiCr"),
the dielectric layers 22, 23, 24, 27, 28; 62, 64, 68; 102, 104, 107, 108; 142, 144 are:
for the layers 22, 24, 64, 104 and 144, made of aluminum-doped silicon nitride, $Si_3N_4$ ("SiN"), for the layer 23, made of aluminum-doped silicon zirconium nitride ("SiZrN"), for the layers 28, 62, 68, 102, 108 and 142, made of aluminum-doped zinc oxide ("ZnO")

for the layers 27, and 107, made of zinc tin oxide ("SnZnO")

the absorbent layers 26, 66, 106 and 146 consist of the same material as the blocking layers; they are metal absorbent layers made of an alloy of nickel and chromium (for NiCr, k=3.0 at 550 nm).

The conditions for deposition of the layers, which were deposited by sputtering ("magnetron cathode" sputtering), are summarized in table 1.

TABLE 1

| | Target employed | Deposition pressure | Gas | n at 550 nm |
|---|---|---|---|---|
| SiN | Si:Al at 92:8 (wt %) | $3.2 \times 10^{-3}$ mbar | Ar/(Ar + $N_2$) at 55% | 2.03 |
| SiZrN | Si (73 at. %); Zr (27 at. %) | $3-4 \times 10^{-3}$ mbar | Ar/(Ar + $N_2$) at 55% | 2.38 |
| ZnO | Zn:Al at 98:2 (wt %) | $1.8 \times 10^{-3}$ mbar | Ar/(Ar + $O_2$) at 63% | 1.95 |
| SnZnO | Sn—Zn at 50:50 (wt %) | $3.1 \times 10^{-3}$ mbar | Ar/(Ar + $O_2$) at 66% | 2.18 |
| NiCr | Ni (80 at. %); Cr (20 at. %) | $2-3 \times 10^{-3}$ mbar | Ar at 100% | 2.50 |
| NbN | Nb | $2 \times 10^{-3}$ mbar | Ar/(Ar + $N_2$) at 60% | 3.80 |
| NiCrN | Ni (80 at. %); Cr (20 at. %) | $3.5 \times 10^{-3}$ mbar | Ar/(Ar + $N_2$) at 34% | 3.0 |
| Ag | Ag | $3 \times 10^{-3}$ mbar | Ar at 100% | — |

At. = atomic

Table 2 lists the materials and the physical thicknesses in nanometers (unless otherwise indicated) of each layer and the corresponding optical thickness (in nanometers) of each dielectric coating as a function of their position with regard to the substrate bearing the stack (final row at the bottom of the table) for a series of examples 1 to 8.

TABLE 2

| | Layer no. in FIG. 1 | Ex. 1 ref | Ex. 2 comp | Ex. 3 inv | Ex. 4 inv | Ex. 5 comp | Ex. 6 inv | Ex. 7 inv | Ex. 8 comp |
|---|---|---|---|---|---|---|---|---|---|
| Eo4 of M4 with | 140 | 76 | 76 | 76 | 76 | 76 | 76 | 80 | 80 |
| Ep (NiCr) | 146 | | 1 | | | | | | |
| Ep ($Si_3N_4$) | 144 | 33.2 | 33.2 | 33.2 | 33.2 | 33.2 | 33.2 | 30.6 | 32.0 |
| Ep (ZnO) | 142 | 5.0 | 5.0 | 5.0 | 5.0 | 5.0 | 5.0 | 10.0 | 8.0 |
| Ep OB3 (NiCr) | 130 | 0.2 | 0.2 | 0.2 | 0.2 | 0.2 | 0.2 | 0.3 | 0.6 |
| Ep (Ag3) | 120 | 14.3 | 14.3 | 14.3 | 14.3 | 14.3 | 14.3 | 15.2 | 18.0 |
| Eo3 of M3 with: | 100 | 150 | 150 | 150 | 150 | 150 | 150 | 156 | 173 |
| Ep (ZnO) | 108 | 5.0 | 5.0 | 5.0 | 5.0 | 5.0 | 5.0 | 4.0 | 8.0 |
| Ep (SnZnO) | 107 | 5.0 | 5.0 | 5.0 | 5.0 | 5.0 | 5.0 | 4.0 | 8.0 |
| Ep (NiCr) | 106 | | | 1 | | | 1 | | |
| Ep ($Si_3N_4$) | 104 | 60.0 | 60.0 | 60.0 | 60.0 | 60.0 | 60.0 | 60.8 | 62.0 |
| Ep (ZnO) | 102 | 5.0 | 5.0 | 5.0 | 5.0 | 5.0 | 5.0 | 10.0 | 8.0 |
| Ep OB2 (NiCr) | 90 | 0.2 | 0.2 | 0.2 | 0.2 | 0.2 | 0.2 | 0.5 | 0.5 |
| Ep Ag2 | 80 | 10.0 | 10.0 | 10.0 | 10.0 | 10.0 | 10.0 | 10.3 | 18.0 |
| Ep UB2 (NiCr) | 70 | 0.5 | 0.5 | 0.5 | 0.5 | 0.5 | 0.5 | <u>1.5</u> | 0.1 |
| Eo2 of M2 with: | 60 | 77 | 77 | 77 | 77 | 77 | 77 | 90 | 122 |
| Ep (ZnO) | 68 | 5.0 | 5.0 | 5.0 | 5.0 | 5.0 | 5.0 | 4.0 | 8.0 |
| Ep (NiCr) | 66 | | | 1 | | | 1 | | |
| Ep ($Si_3N_4$) | 64 | 28.6 | 28.6 | 28.6 | 28.6 | 28.6 | 28.6 | 37.3 | 45.0 |
| Ep (ZnO) | 62 | 5.0 | 5.0 | 5.0 | 5.0 | 5.0 | 5.0 | 4.0 | 8.0 |
| Ep OB1 (NiCr) | 50 | 0.2 | 0.2 | 0.2 | 0.2 | 0.2 | 0.2 | 0.2 | 1.4 |
| Ep Ag1 | 40 | 10.0 | 10.0 | 10.0 | 10.0 | 10.0 | 10.0 | 10.0 | 10.0 |
| Ep UB1 (NiCr) | 30 | 0.3 | 0.3 | 0.3 | 0.3 | 0.3 | 0.3 | 0.1 | 0.7 |
| Eo1 of M1 with: | 20 | 154 | 154 | 154 | 154 | 154 | 154 | 152 | 95 |
| Ep (ZnO) | 28 | 5.0 | 5.0 | 5.0 | 5.0 | 5.0 | 5.0 | 4.0 | 8.0 |
| Ep (SnZnO) | 27 | 8.7 | 8.7 | 8.7 | 8.7 | 8.7 | 8.7 | 4.7 | |
| Ep (NiCr) | 26 | | | | | 1 | | | |
| Ep ($Si_3N_4$) | 24 | 25.0 | 25.0 | 25.0 | 25.0 | 25.0 | 25.0 | 30.0 | |
| Ep (SiZrN) | 23 | 15.6 | 15.6 | 15.6 | 15.6 | 15.6 | 15.6 | 6.3 | |
| Ep ($Si_3N_4$) | 22 | 19.3 | 19.3 | 19.3 | 19.3 | 19.3 | 19.3 | 30.0 | 40 |
| Glass substrate (mm) | | 6 | 6 | 6 | 6 | 6 | 6 | 6 | 6 |

*Ep: Physical thickness (nm); Eo: Optical thickness (nm).

Example 1 is the reference example ("ref"); i.e. the example which is used as a basis for explaining the invention. Examples 3, 4, 6 and 7 are examples according to the invention ("inv"). The comparative examples 2, 5 and 8 are examples outside of the invention ("comp").

Examples 1 to 8 are examples having three silver-based functional metal layers.

Table 3 lists the main optical characteristics measured when the stacks form part of a double glazing of 6/16/4 structure: (external) 6-mm glass/16-mm interlayer space filled with 90% argon/4-mm glass (internal), the stack being positioned on face 2 (face 1 of the glazing being the outermost face of the glazing, as usual).

For these double glazings, $T_L$ indicates: the light transmission in the visible region in %, measured according to the illuminant D65 at 2° observer;

$a^*_T$ and $b^*_T$ indicate the colors at normal incidence (0°) in transmission $a^*$ and $b^*$ in the $L^*a^*b^*$ system, measured according to the illuminant D65 at 2° observer and measured perpendicularly to the glazing;

$R_e$ indicates: the light reflection in the visible region in %, measured according to the illuminant D65 at 2° observer on the side of the outermost face, face 1;

$a^*_{Re}$ and $b^*_{Re}$ indicate the colors at normal incidence (0°) in reflection $a^*$ and $b^*$ in the $L^*a^*b^*$ system, measured according to the illuminant D65 at 2° observer on the side of the outermost face and thus measured perpendicularly to the glazing, $R_i$ indicates: the light reflection in the visible region in %, measured according to the illuminant D65 at 2° observer on the side of the interior face, face 4;

$a^*_{Ri}$ and $b^*_{Ri}$ indicate the colors at normal incidence (0°) in reflection $a^*$ and $b^*$ in the $L^*a^*b^*$ system, measured according to the illuminant D65 at 2° observer on the side of the interior face and thus measured perpendicularly to the glazing;

$a^*(60°)$ and $b^*(60°)$ indicate the colors $a^*$ and $b^*$ in reflection in the $L^*a^*b^*$ system, measured at 60° incidence with respect to the normal according to the illuminant D65 at 2° observer on the glass side, on the opposite side to the stack, for the (monolithic) substrate alone.

The target values indicated below are the values which are preferred simultaneously for the invention, in a very successful version of the invention.

According to the invention, it is possible to produce a glazing comprising a stack having three functional metal layers which has a low light transmission $T_L$ of the order of 50% (between 40% and 55%, including these values), with a high external reflection $R_e$ of the order of at least 27% (between 27% and 35%, including these values) and a low internal reflection $R_i$ of the order of 20% or less (between 5% and 20%, including these values), with a selectivity S≥1.8 for a double glazing with the stack of thin layers on face 2. Examples 3, 4, 6 and 7 all have all these features, owing in particular to the specific layers made of absorbent material which are underlined in the table:

for example 3 owing to the fact that the absorbent material is present between the second functional layer 80 and the third functional layer 120, these are the layers 90 and 106, in a total thickness of 1.2 nm and to the fact that the absorbent material is present between the face of the substrate and the first functional layer 40, this is the layer 30, in a total thickness of only 0.3 nm and absorbent material is present above the third functional layer 120, this is the layer 130, in a total thickness of only 0.2 nm;

for example 4 owing to the fact that the absorbent material is present between the first functional layer 40 and the second functional layer 80, these are the layers 50, 66 and 70, in a total thickness of 1.7 nm and to the fact that absorbent material is present between the face of the substrate and the first functional layer 40, this is the layer 30, in a total thickness of only 0.3 nm and absorbent material is present above the third functional layer 120, this is the layer 130, in a total thickness of only 0.2 nm;

for example 6 owing to the fact that the absorbent material is present between said first functional layer 40 and said second functional layer 80, these are the layers 50, 66 and 70, in a total thickness of 1.7 nm and absorbent material is present between the second functional layer 80 and the third functional layer 120, these are the layers 90 and 106, in a total thickness of 1.2 nm and to the fact that absorbent material is present between the face of the substrate and the first functional layer 40, this is the layer 30, in a total thickness of only 0.3 nm and absorbent material is present above the third functional layer 120, this is the layer 130, in a total thickness of only 0.2 nm;

TABLE 3

|  | Target value | Ex. 1 (ref) | Ex. 2 (comp) | Ex. 3 (inv) | Ex. 4 (inv) | Ex. 5 (comp) | Ex. 6 (inv) | Ex. 7 (inv) | Ex. 8 (comp) |
|---|---|---|---|---|---|---|---|---|---|
| Solar factors "g" |  | 0.26 | 0.22 | 0.23 | 0.23 | 0.24 | 0.21 | 0.26 | 0.21 |
| Selectivity "s" | ≥1.8 | 1.88 | 1.92 | 1.93 | 1.85 | 1.86 | 1.88 | 1.83 | 2.24 |
| $T_L(\%)$ | 50 | 49 | 43 | 45 | 42 | 45 | 39 | 48 | 47 |
| $a^*_T$ | <0 | −3.6 | −1.3 | −8.2 | −3.5 | −3.8 | −7.6 | −4.9 | −8.0 |
| $b^*_T$ | {−5.0; 1.0} | −0.4 | 1.5 | −1.6 | −2.7 | −0.8 | −4.4 | −0.1 | 1.0 |
| $R_e(\%)$ | ≥28 | 32 | 31 | 30 | 35 | 28 | 33 | 29 | 16 |
| $a^*_{Re}$ | {−5.0; 0} | −3.6 | −10.8 | −2.5 | −4.2 | −4.0 | −1.0 | −2.1 | −5.0 |
| $b^*_{Re}$ | {−8.0; 0} | −2.0 | −4.6 | −4.2 | −4.1 | −3.5 | −1.6 | −5.2 | −9.0 |
| $R_i(\%)$ | ≤20 | 26 | 26 | 20 | 20 | 28 | 19 | 20 | 18 |
| $a^*_{Ri}$ | {−7.0; 0} | −8.5 | −24.3 | −6.4 | −7.0 | −8.8 | −3.4 | −3.6 | −11.0 |
| $b^*_{Ri}$ | {−8.0; 0} | −0.5 | 12.9 | −12.6 | −2.5 | −0.4 | −6.0 | −6.2 | −10.0 |
| $a^*(60°)$ |  | 0.6 | 6.4 | 7.1 | 0.2 | −1.1 | 5.6 | −4.7 | −4.5 |
| $b^*(60°)$ |  | 10.5 | −17.5 | −8.3 | −9.4 | −10.1 | −7.3 | −7.7 | −3.0 | for example 7 owing to the fact that the absorbent material is present between said first functional layer 40 and said second functional layer 80, these are the layers 50 and 70, in a total thickness of 1.7 nm and to the fact that absorbent material is present between the face of the substrate and the first functional layer 40, this is the layer 30, in a total thickness of only 0.3 nm and absorbent material is present above the third functional layer 120, this is the layer 130, in a total thickness of only 0.2 nm.

For these examples according to the invention, it should be noted that the absorbent material is present in a relatively large thickness between the first and the second functional layers and/or between the second and the third functional layers whereas it is present in a relatively small thickness below the first functional layer and above the third functional layer; it is this particular distribution of the absorbent material which makes it possible to obtain a glazing simultaneously having a low light transmission of the order of 50%, a high external reflection $R_e$ of the order of at least 27% and a low internal reflection $R_i$ of the order of 20% or less.

Examples 1, 2, 5 and 8 do not make it possible to produce a glazing which has a low light transmission $T_L$ of the order of 50% (between 40% and 55%, including these values), with a high external reflection $R_e$ of the order of at least 27% (between 27% and 35%, including these values) and a low internal reflection $R_i$ of the order of 20% or less (between 5% and 20%, including these values), with a selectivity $S \geq 1.8$:

for example 1 owing to the fact that there is not enough absorbent material in the stack;

for example 2 owing to the fact that the absorbent material, that of the layer 146, is positioned completely over the stack, as final layer;

for example 5 owing to the fact that the absorbent material, that of the layer 26, is positioned in the first dielectric coating 20;

for example 8 owing to the fact that there is too much absorbent material between the substrate and the first functional metal layer 40 (the layer 30 of 0.7 nm) and too much absorbent material above the third functional metal layer 120 (the layer 130 of 0.6 nm).

Examples 3, 4, 6 and 7 according to the invention all have a pleasant and very weak coloration in transmission, preferably in the range of the blues or blue-greens, but of very low strength.

Table 4 lists the materials and the physical thicknesses in nanometers (unless otherwise indicated) of each layer and the corresponding optical thickness (in nanometers) of each dielectric coating as a function of their position with regard to the substrate bearing the stack (final row at the bottom of the table) for a series of examples 10 to 20.

TABLE 4

|  | Layer no. in FIG. 1 | Ex. 10 ref | Ex. 11 comp | Ex. 12 comp | Ex. 13 inv | Ex. 14 inv | Ex. 15 inv |
|---|---|---|---|---|---|---|---|
| Eo4 of M4 with | 140 | 80.3 | 80.3 | 80.3 | 80.3 | 80.3 | 80.3 |
| Ep ($Si_3N_4$) | 144 | 30.6 | 30.6 | 30.6 | 30.6 | 30.6 | 30.6 |
| Ep (ZnO) | 142 | 10.0 | 10.0 | 10.0 | 10.0 | 10.0 | 10.0 |
| Ep OB3 (NiCr) | 130 | 0.3 | 0.3 | 1.3 | 0.3 | 0.3 | 0.3 |
| Ep (Ag3) | 120 | 15.2 | 15.2 | 15.2 | 15.2 | 15.2 | 15.2 |
| Eo3 of M3 with: | 100 | 156.1 | 156.1 | 156.1 | 156.1 | 156.1 | 156.1 |
| Ep (ZnO) | 108 | 4.0 | 4.0 | 4.0 | 4.0 | 4.0 | 4.0 |
| Ep (SnZnO) | 107 | 4.0 | 4.0 | 4.0 | 4.0 | 4.0 | 4.0 |
| Ep (NiCr) | 106 |  |  |  |  |  |  |
| Ep ($Si_3N_4$) | 104 | 61 | 61 | 61 | 61 | 61 | 61 |
| Ep (ZnO) | 102 | 10.0 | 10.0 | 10.0 | 10.0 | 10.0 | 10.0 |
| Ep OB2 (NiCr) | 90 | 0.25 | 0.25 | 0.25 | 0.25 | 1.25 | 0.25 |
| Ep Ag2 | 80 | 10.5 | 10.5 | 10.5 | 10.5 | 10.5 | 10.5 |
| Ep UB2 (NiCr) | 70 | 0.5 | 0.5 | 0.5 | 1.5 | 0.5 | 0.5 |
| Eo2 of M2 with: | 60 | 89.5 | 89.5 | 89.5 | 89.5 | 89.5 | 89.5 |
| Ep (ZnO) | 68 | 4.0 | 4.0 | 4.0 | 4.0 | 4.0 | 4.0 |
| Ep (NiCr) | 66 |  |  |  |  |  | 1.0 |
| Ep ($Si_3N_4$) | 64 | 37.0 | 37.0 | 37.0 | 37.0 | 37.0 | 37.0 |
| Ep (ZnO) | 62 | 4.0 | 4.0 | 4.0 | 4.0 | 4.0 | 4.0 |
| Ep OB1 (NiCr) | 50 | 0.15 | 0.15 | 0.15 | 0.15 | 0.15 | 0.15 |
| Ep Ag1 | 40 | 10.0 | 10.0 | 10.0 | 10.0 | 10.0 | 10.0 |
| Ep UB1 (NiCr) | 30 | 0.15 | 1.15 | 0.15 | 0.15 | 0.15 | 0.15 |
| Eo1 of M1 with: | 20 | 151.7 | 151.7 | 151.7 | 151.7 | 151.7 | 151.7 |
| Ep (ZnO) | 28 | 4.0 | 4.0 | 4.0 | 4.0 | 4.0 | 4.0 |
| Ep (SnZnO) | 27 | 4.7 | 4.7 | 4.7 | 4.7 | 4.7 | 4.7 |
| Ep ($Si_3N_4$) | 24 | 30.0 | 30.0 | 30.0 | 30.0 | 30.0 | 30.0 |
| Ep (SiZrN) | 23 | 6.0 | 6.0 | 6.0 | 6.0 | 6.0 | 6.0 |
| Ep ($Si_3N_4$) | 22 | 30.0 | 30.0 | 30.0 | 30.0 | 30.0 | 30.0 |
| Glass substrate (mm) |  | 6 | 6 | 6 | 6 | 6 | 6 |

|  | Layer no. in FIG. 1 | Ex. 10 ref | Ex. 16 inv | Ex. 17 inv | Ex. 18 inv | Ex. 19 comp | Ex. 20 inv |
|---|---|---|---|---|---|---|---|
| Eo4 of M4 with | 140 | 80.3 | 80.3 | 80.3 | 80.3 | 80.3 | 80.3 |
| Ep ($Si_3N_4$) | 144 | 30.6 | 30.6 | 30.6 | 30.6 | 30.6 | 30.6 |
| Ep (ZnO) | 142 | 10.0 | 10.0 | 10.0 | 10.0 | 10.0 | 10.0 |
| Ep OB3 (NiCr) | 130 | 0.3 | 0.3 | 0.3 | 0.3 | 0.3 | 0.3 |
| Ep (Ag3) | 120 | 15.2 | 15.2 | 15.2 | 15.2 | 15.2 | 15.2 |
| Eo3 of M3 with: | 100 | 156.1 | 156.1 | 156.1 | 156.1 | 156.1 | 156.1 |
| Ep (ZnO) | 108 | 4.0 | 4.0 | 4.0 | 4.0 | 4.0 | 4.0 |
| Ep (SnZnO) | 107 | 4.0 | 4.0 | 4.0 | 4.0 | 4.0 | 4.0 |
| Ep (NiCr) | 106 |  |  | 0.5 |  |  |  |

TABLE 4-continued

| | | | | | | | |
|---|---|---|---|---|---|---|---|
| Ep (Si$_3$N$_4$) | 104 | 61 | 61 | 61 | 61 | 61 | 61 |
| Ep (ZnO) | 102 | 10.0 | 10.0 | 10.0 | 10.0 | 10.0 | 10.0 |
| Ep OB2 (NiCr) | 90 | 0.25 | 0.25 | 0.25 | 0.25 | 0.25 | 0.75 |
| Ep Ag2 | 80 | 10.5 | 10.5 | 10.5 | 10.5 | 10.5 | 10.5 |
| Ep UB2 (NiCr) | 70 | 0.5 | <u>1.0</u> | <u>1.0</u> | <u>1.0</u> | 0.8 | <u>1.0</u> |
| Eo2 of M2 with: | 60 | 89.5 | 89.5 | 89.5 | 89.5 | 89.5 | 89.5 |
| Ep (ZnO) | 68 | 4.0 | 4.0 | 4.0 | 4.0 | 4.0 | 4.0 |
| Ep (NiCr) | 66 | | 0.5 | | | | |
| Ep (Si$_3$N$_4$) | 64 | 37.0 | 37.0 | 37.0 | 37.0 | 37.0 | 37.0 |
| Ep (ZnO) | 62 | 4.0 | 4.0 | 4.0 | 4.0 | 4.0 | 4.0 |
| Ep OB1 (NiCr) | 50 | 0.15 | 0.15 | 0.15 | 0.15 | 0.15 | 0.15 |
| Ep Ag1 | 40 | 10.0 | 10.0 | 10.0 | 10.0 | 10.0 | 10.0 |
| Ep UB1 (NiCr) | 30 | 0.15 | 0.15 | 0.15 | 0.15 | 0.15 | 0.15 |
| Eo1 of M1 with: | 20 | 151.7 | 151.7 | 151.7 | 151.7 | 151.7 | 151.7 |
| Ep (ZnO) | 28 | 4.0 | 4.0 | 4.0 | 4.0 | 4.0 | 4.0 |
| Ep (SnZnO) | 27 | 4.7 | 4.7 | 4.7 | 4.7 | 4.7 | 4.7 |
| Ep (Si$_3$N$_4$) | 24 | 30.0 | 30.0 | 30.0 | 30.0 | 30.0 | 30.0 |
| Ep (SiZrN) | 23 | 6.0 | 6.0 | 6.0 | 6.0 | 6.0 | 6.0 |
| Ep (Si$_3$N$_4$) | 22 | 30.0 | 30.0 | 30.0 | 30.0 | 30.0 | 30.0 |
| Glass substrate (mm) | 6 | 6 | 6 | 6 | 6 | 6 | 6 |

*Ep: Physical thickness (nm); Eo: Optical thickness (nm).

Table 5 lists the main optical characteristics measured, like for table 3, when the stacks form part of a double glazing of 6/16/4 structure: (external) 6-mm glass/16-mm interlayer space filled with 90% argon/4-mm glass (internal), the stack being positioned on face 2 (face 1 of the glazing being the outermost face of the glazing, as usual).

TABLE 5

| | Ex. 10 ref | Ex. 11 comp | Ex. 12 comp | Ex. 13 inv | Ex. 14 inv | Ex. 15 inv | Ex. 16 inv | Ex. 17 inv | Ex. 18 inv | Ex. 19 comp | Ex. 20 inv |
|---|---|---|---|---|---|---|---|---|---|---|---|
| g | 29.1 | 26.5 | 26.7 | 26.1 | 26.0 | 25.8 | 25.9 | 26.0 | 27.5 | 28.1 | 26 |
| s | 1.87 | 1.86 | 1.93 | 1.84 | 1.83 | 1.85 | 1.85 | 1.89 | 1.86 | 1.86 | 1.83 |
| T$_L$(%) | 54.3 | 49.2 | 51.6 | 48.0 | 47.5 | 47.7 | 47.8 | 49.2 | 51.1 | 52.3 | 47.7 |
| a*$_T$ | −4.4 | −4.5 | −6.2 | −4.9 | −4.9 | −4.8 | −4.9 | −6.6 | −4.7 | −4.6 | −4.9 |
| b*$_T$ | 3.4 | 3.8 | 5.6 | −0.1 | −1.2 | 0.3 | 0.1 | 1.6 | 1.6 | 2.3 | −0.6 |
| R$_e$(%) | 26.8 | 26.3 | 25.0 | 29.2 | 29.4 | 29.7 | 29.6 | 26.9 | 28.2 | 27.7 | 29.5 |
| a*$_{Re}$ | −2.5 | −3.5 | −1.1 | −2.1 | −1.9 | −2.3 | −2.2 | 0.2 | −2.3 | −2.3 | −2.0 |
| b*$_{Re}$ | −8.7 | −8.5 | −15.1 | −5.2 | −3.7 | −5.7 | −5.5 | −9.1 | −7.0 | −7.7 | −4.5 |
| R$_i$(%) | 22.0 | 23.8 | 21.2 | 19.7 | 18.8 | 20.0 | 19.8 | 19.0 | 20.0 | 21.1 | 19.1 |
| a*$_{Ri}$ | −6.5 | −6.9 | −12.4 | −3.6 | −3.1 | −3.8 | −3.7 | −5.8 | −5.0 | −5.6 | −3.3 |
| b*$_{Ri}$ | −7.9 | −7.7 | −7.8 | −6.2 | −7.6 | −6.0 | −6.1 | −11.9 | −7.2 | −7.5 | −6.9 |
| a*(60°) | −5.9 | −7.5 | 1.0 | −4.7 | −4.3 | −5.9 | −4.8 | −1.4 | −5.2 | −5.4 | −4.4 |
| b*(60°) | −9.6 | −9.3 | −14.2 | −7.7 | −6.5 | −9.7 | −8.0 | −8.5 | −8.7 | −9.1 | −7.1 |

According to the invention, it is possible to produce a glazing comprising a stack having three functional metal layers which has a low light transmission T$_L$ of the order of 50% (between 40% and 55%, including these values), with a high external reflection R$_e$ of the order of at least 27% (between 27% and 35%, including these values) and a low internal reflection R$_i$ of the order of 20% or less (between 5% and 20%, including these values), with a selectivity S≥1.8 for a double glazing with the stack of thin layers on face 2. Examples 13 to 18 and 20 all have all these features, owing in particular to the specific layers made of absorbent material which are underlined in the table:

for example 13 owing to the fact that absorbent material is present between the first functional layer 40 and the second functional layer 80, these are the layers 50 and 70, in a total thickness of 1.65 nm and to the fact that absorbent material is present between the face of the substrate and the first functional layer 40, this is the layer 30, in a total thickness of only 0.15 nm and absorbent material is present above the third functional layer 120, this is the layer 130, in a total thickness of only 0.3 nm;

for example 14 owing to the fact that de the absorbent material is present between the second functional layer 80 and the third functional layer 120, this is the layer 90, in a total thickness of 1.25 nm and to the fact that absorbent material is present between the face of the substrate and the first functional layer 40, this is the layer 30, in a total thickness of only 0.15 nm and absorbent material is present above the third functional layer 120, this is the layer 130, in a total thickness of only 0.3 nm;

for example 15 owing to the fact that absorbent material is present between the first functional layer 40 and the second functional layer 80, these are the layers 50, 66 and 70, in a total thickness of 1.65 nm and to the fact that absorbent material is present between the face of the substrate and the first functional layer 40, this is the layer 30, in a total thickness of only 0.15 nm and absorbent material is present above the third functional layer 120, this is the layer 130, in a total thickness of only 0.3 nm;

for example 16 owing to the fact that absorbent material is present between the first functional layer 40 and the second functional layer 80, these are the layers 50, 66 and 70, in a total thickness of 1.65 nm and to the fact that absorbent material is present between the face of the substrate and the first functional layer 40, this is the layer 30, in a total thickness of only 0.15 nm and absorbent material is present above the third functional layer 120, this is the layer 130, in a total thickness of only 0.3 nm;

for example 17 owing to the fact that absorbent material is present between the first functional layer 40 and the second functional layer 80, these are the layers 50 and 70, in a total thickness of 1.15 nm and to the fact that absorbent material is present between the face of the substrate and the first functional layer 40, this is the layer 30, in a total thickness of only 0.15 nm and absorbent material is present above the third functional layer 120, this is the layer 130, in a total thickness of only 0.3 nm; this example 17 further comprising an absorbent layer 106 in the third dielectric coating;

for example 18 owing to the fact that absorbent material is present between the first functional layer 40 and the second functional layer 80, these are the layers 50 and 70, in a total thickness of 1.15 nm and to the fact that absorbent material is present between the face of the substrate and the first functional layer 40, this is the layer 30, in a total thickness of only 0.15 nm and absorbent material is present above the third functional layer 120, this is the layer 130, in a total thickness of only 0.3 nm; and for example 20 owing to the fact that absorbent material is present between the first functional layer 40 and the second functional layer 80, these are the layers 50, 66 and 70, in a total thickness of 1.15 nm and to the fact that absorbent material is present between the face of the substrate and the first functional layer 40, this is the layer 30, in a total thickness of only 0.15 nm and absorbent material is present above the third functional layer 120, this is the layer 130, in a total thickness of only 0.3 nm.

Examples 10 to 12 and 19 do not make it possible to produce a glazing which has a low light transmission $T_L$ of the order of 50% (between 40% and 55%, including these values), with a high external reflection $R_e$ of the order of at least 27% (between 27% and 35%, including these values) and a low internal reflection $R_i$ of the order of 20% or less (between 5% and 20%, including these values), with a selectivity $S \geq 1.8$:

for example 10 owing to the fact that there is not enough absorbent material in the stack;

for example 11 owing to the fact that the absorbent material, that of the layer 30, is positioned below the first functional metal layer 20;

for example 12 owing to the fact that the absorbent material, that of the layer 130, is positioned above the third functional metal layer 120;

for example 19 owing to the fact that there is not enough absorbent material between the first functional metal layer 40 and the second functional metal layer 80.

Two additional examples were carried out on the basis of example 15, replacing the layer 64, made of absorbent material, of 1 nm of NiCr with:

a layer 64, made of absorbent material, of 1 nm of NbN (example 21; k=2.9 at 550 nm) and a layer 64, made of absorbent material, of 1 nm of NiCrN (example 22; k=3.3 at 550 nm).

These examples made it possible to produce a glazing of the same type as that of tables 3 and 5 having:

a low light transmission $T_L$ of 50.2% (example 21) and of 46.1% (example 22), a high external reflection $R_e$ of 27.8% (example 21) and of 29.2% (example 22), a low internal reflection $R_i$ of 19.2% (example 21) and of 17.2% (example 22), a high solar factor "g" of 27.4% (example 21) and of 25.5% (example 22), and a high selectivity "s" of 1.83 (example 21) and of 1.81 (example 22).

Another series of examples was carried out with distributions of thicknesses of the functional layers which are different.

Table 6 lists the materials and the physical thicknesses in nanometers (unless otherwise indicated) of each layer and the corresponding optical thickness (in nanometers) of each dielectric coating as a function of their position with regard to the substrate bearing the stack (final row at the bottom of the table) for a series of examples 21 to 26.

TABLE 6

|  | Layer no. in FIG. 1 | Ex. 21 inv | Ex. 22 comp | Ex. 23 comp | Ex. 24 inv | Ex. 25 comp | Ex. 26 comp |
|---|---|---|---|---|---|---|---|
| Eo4 of M4 with | 140 | 79.0 | 79.0 | 95.0 | 79.0 | 79.0 | 90.0 |
| Ep ($Si_3N_4$) | 144 | 34.3 | 34.3 | 42.3 | 34.4 | 34.4 | 39.9 |
| Ep (ZnO) | 142 | 5.0 | 5.0 | 5.0 | 5.0 | 5.0 | 5.0 |
| Ep OB3 (NiCr) | 130 | 0.2 | 1.5 | 1.5 | 0.3 | 1.5 | 1.5 |
| Ep (Ag3) | 120 | 16.0 | 16.0 | 16.0 | 15.0 | 15.0 | 15.0 |
| Eo3 of M3 with: | 100 | 153 | 153 | 163 | 145 | 145 | 157 |
| Ep (ZnO) | 108 | 5.0 | 5.0 | 5.0 | 5.0 | 5.0 | 5.0 |
| Ep (SnZnO) | 107 | 5.0 | 5.0 | 5.0 | 5.0 | 5.0 | 5.0 |
| Ep ($Si_3N_4$) | 104 | 61.5 | 61.5 | 66.6 | 57.3 | 57.3 | 63.5 |
| Ep (ZnO) | 102 | 5.0 | 5.0 | 5.0 | 5.0 | 5.0 | 5.0 |
| Ep OB2 (NiCr) | 90 | 0.2 | 0.2 | 0.2 | 0.2 | 0.2 | 0.2 |
| Ep Ag2 | 80 | 12.0 | 12.0 | 12.0 | 8.0 | 8.0 | 8.0 |
| Ep UB2 (NiCr) | 70 | 1.5 | 0.2 | 0.2 | 1.5 | 0.2 | 0.2 |
| Eo2 of M2 with: | 60 | 94 | 94 | 82 | 87 | 87 | 77 |
| Ep (ZnO) | 68 | 5.0 | 5.0 | 5.0 | 5.0 | 5.0 | 5.0 |
| Ep ($Si_3N_4$) | 64 | 36.8 | 36.8 | 31.2 | 33.3 | 33.3 | 28.3 |
| Ep (ZnO) | 62 | 5.0 | 5.0 | 5.0 | 5.0 | 5.0 | 5.0 |
| Ep OB1 (NiCr) | 50 | 0.2 | 0.2 | 0.2 | 0.2 | 0.2 | 0.2 |
| Ep Ag1 | 40 | 8.0 | 8.0 | 8.0 | 10.0 | 10.0 | 10.0 |
| Ep UB1 (NiCr) | 30 | 0.3 | 0.3 | 0.3 | 0.3 | 0.3 | 0.3 |
| Eo1 of M1 with: | 20 | 148 | 148 | 220 | 151 | 151 | 253 |
| Ep (ZnO) | 28 | 5.0 | 5.0 | 5.0 | 5.0 | 5.0 | 5.0 |
| Ep (SnZnO) | 27 | 9.0 | 9.0 | 9.0 | 9.0 | 9.0 | 9.0 |

TABLE 6-continued

|  | Layer no. in FIG. 1 | Ex. 21 inv | Ex. 22 comp | Ex. 23 comp | Ex. 24 inv | Ex. 25 comp | Ex. 26 comp |
|---|---|---|---|---|---|---|---|
| Ep ($Si_3N_4$) | 24 | 25.0 | 25.0 | 50.0 | 32.8 | 32.8 | 47.1 |
| Ep (SiZrN) | 23 | 15.6 | 15.6 | 15.6 | 15.6 | 15.6 | 15.6 |
| Ep ($Si_3N_4$) | 22 | 19.3 | 19.3 | 30.0 | 13.3 | 13.3 | 50.0 |
| Glass substrate (mm) |  | 6 | 6 | 6 | 6 | 6 | 6 |

*Ep: Physical thickness (nm); Eo: Optical thickness (nm).

Table 7 lists the main optical characteristics measured, like for tables 3 and 5, when the stacks form part of a double glazing of 6/16/4 structure: (external) 6-mm glass/16-mm interlayer space filled with 90% argon/4-mm glass (internal), the stack being positioned on face 2 (face 1 of the glazing being the outermost face of the glazing, as usual).

TABLE 7

|  | Preferred values | More preferred values | Ex. 21 inv | Ex. 22 comp | Ex. 23 comp | Ex. 24 inv | Ex. 25 comp | Ex. 26 comp |
|---|---|---|---|---|---|---|---|---|
| g |  |  | 25.2 | 25.8 | 24.4 | 25.7 | 26.8 | 26.6 |
| s |  |  | 1.9 | 2.0 | 2.1 | 1.8 | 2.0 | 1.9 |
| $T_L$(%) | ≥55.0 |  | 47.1 | 51.9 | 50.4 | 46.9 | 52.5 | 51.6 |
|  | ≤40.0 |  |  |  |  |  |  |  |
| $a^*_T$ |  | <0 | −6.0 | −9.5 | −8.1 | −5.7 | −8.0 | −5.7 |
| $b^*_T$ |  | {−5.0; 1.0} | −3.2 | 4.0 | 1.8 | −0.2 | 8.3 | 0.7 |
| $R_e$(%) | ≥27.0 |  | 28.1 | 22.6 | 27.0 | 28.3 | 22.9 | 26.1 |
| $a^*_{Re}$ |  | {−5.0; 0} | −2.2 | 3.6 | −2.0 | −1.8 | 1.6 | −3.7 |
| $b^*_{Re}$ |  | {−8.0; 0} | −0.3 | −13.5 | −1.1 | −6.9 | −20.4 | −2.0 |
| $R_i$(%) | ≤20.0 |  | 20.0 | 22.6 | 22 | 17.6 | 20.3 | 21 |
| $a^*_{Ri}$ |  | {−7.0; 0} | −0.2 | −12.7 | −4.7 | −0.1 | −12.8 | −6.1 |
| $b^*_{Ri}$ |  | {−8.0; 0} | −1.4 | −6.8 | −8.0 | −8 | −11.0 | −5.0 |
| a*(60°) |  |  | 2.3 | 13.3 | 5.0 | −0.5 | 7.9 | −2.6 |
| b*(60°) |  |  | −6.0 | −12.2 | −3.3 | −10.0 | −18.3 | −2.8 |

Example 21 according to the invention differs from the preceding examples by a different distribution of the thickness of the functional metal layers: the first functional metal layer is thinner than before, the second functional metal layer is thicker than the first and the third functional metal layer is thicker than the second.

Example 24 according to the invention differs from the preceding examples by a different distribution of the thickness of the functional metal layers: the second functional metal layer is the thinnest, the first functional metal layer is thicker than the second and the third functional metal layer is thicker than the first.

For these examples 21 and 24, the relatively large thickness of the layers of absorbent material in the second and third dielectric coatings compared to the relatively thin thickness of the layers of absorbent material in the first and fourth dielectric coatings makes it possible to attain the preferred optical characteristics for the invention (recalled in the second column) and even the more preferred values (in the 3$^{rd}$ column).

Examples 22 and 23 have the same distribution for the thickness of the functional metal layers as example 21 but do not attain the preferred optical characteristics for the invention since the thickness of the layers of absorbent material in the first and fourth dielectric coatings is too high compared to the thickness of the layers of absorbent material in the second and third dielectric coatings.

Likewise, examples 25 and 26 have the same distribution for the thickness of the functional metal layers as example 24 but do not attain the preferred optical characteristics for the invention since the thickness of the layers of absorbent material in the first and fourth dielectric coatings is too high compared to the thickness of the layers of absorbent material in the second and third dielectric coatings.

The invention claimed is:

1. A material comprising a transparent substrate coated on one face with a stack of thin layers successively comprising, starting from said face, an alternation:
of three silver-based functional metal layers denoted, starting from the substrate, first functional layer Ag1, second functional layer Ag2 and third functional layer Ag3, with physical thicknesses respectively Ea1, Ea2 and Ea3, and
of four dielectric coatings denoted, starting from said face of the substrate, M1, M2, M3 and M4, with optical thicknesses respectively Eo1, Eo2, Eo3 and Eo4, each dielectric coating comprising a dielectric layer or a dielectric assembly of layers,
so that each functional metal layer is positioned between two dielectric coatings,
wherein:
absorbent material is present between said first functional layer Ag1 and said second functional layer Ag2, in a total thickness Abs2 such that 1.0≤Abs2≤5.0 nm and/or absorbent material is present between said second functional layer Ag2 and said third functional layer Ag3, in a total thickness Abs3 such that 1.0≤Abs3≤5.0 nm; and
absorbent material is present between said face of the substrate and said first functional layer Ag1 in a total thickness Abs1 such that 0.0<Abs1≤0.5 nm and absorbent material is present above said third functional layer Ag3, in a total thickness Abs4 such that $0.0<Abs4\leq0.5$ nm.

2. The material as claimed in claim 1, wherein the physical thicknesses Ea1 and the Ea2 respectively of said first and said second functional layers Ag1, Ag2 are each between 7.0 and 12.0 nm and the physical thickness Ea3 of said third functional layer Ag3 is between 13.0 and 16.0 nm.

3. The material as claimed in claim 1, wherein said absorbent material present between said first functional layer Ag1 and said second functional layer Ag2 is present in contact with said functional layer Ag2, with at least half of said total thickness Abs2 located in contact with said functional layer Ag2.

4. The material as claimed in claim 1, wherein said absorbent material present between said second functional layer Ag2 and said third functional layer Ag3 is present in contact with said functional layer Ag2, with at least half of said total thickness Abs3 located in contact with said functional layer Ag2.

5. The material as claimed in claim 1, wherein said first dielectric coating M1, comprises a high-index layer, having a refractive index at 550 nm which is at least 2.15, and having an optical thickness $Eo_{12}$ between 10.0 and 40.0 nm.

6. The material as claimed in claim 1, wherein said first dielectric coating M1 has an optical thickness Eo1 between 130.0 and 160.0 nm.

7. The material as claimed in claim 1, wherein said second dielectric coating M2 has an optical thickness Eo2 between 80.0 and 100.0 nm.

8. The material as claimed in claim 1, wherein said third dielectric coating M3 has an optical thickness Eo3 between 140.0 and 180.0 nm.

9. The material as claimed in claim 1, wherein said fourth dielectric coating M4 has an optical thickness Eo4 between 50.0 and 90.0 nm.

10. The material as claimed in claim 1, wherein a ratio of the optical thickness Eo2 of said second dielectric coating M2 to the optical thickness Eo1 of said first dielectric coating M1 is equal to or greater than 0.4 and less than or equal to 0.9.

11. The material as claimed in claim 1, wherein a ratio of the optical thickness Eo1 of said first dielectric coating M1 to the optical thickness Eo4 of said fourth dielectric coating M4 is greater than 1.5.

12. The material as claimed in claim 1, wherein a ratio of the optical thickness Eo3 of said third dielectric coating M3 to the optical thickness Eo1 of said first dielectric coating M1 is between 0.9 and 1.1.

13. A glazing comprising:
the material as claimed in claim 1.

14. The glazing as claimed in claim 13, wherein the glazing is a double glazing having a light transmission $T_L$ of $40.0\%\leq T_L\leq 55.0\%$, an external reflection $R_e$ of at least 27.0% and an internal reflection $R_i$ of 20.0% or less.

15. The glazing as claimed in claim 13, wherein the glazing is a laminated or multiple glazing.

16. The glazing as claimed in claim 13, wherein the glazing is a triple glazing.

17. The material as claimed in claim 1, wherein said absorbent material present between said first functional layer Ag1 and said second functional layer Ag2 is present in contact with said functional layer Ag2, with all of said total thickness Abs2 located in contact with said functional layer Ag2.

18. The material as claimed in claim 1, wherein said absorbent material present between said second functional layer Ag2 and said third functional layer Ag3 is present in contact with said functional layer Ag2, with all of said total thickness Abs3 located in contact with said functional layer Ag2.

19. The material as claimed in claim 1, wherein only said first dielectric coating M1 comprises a high-index layer, having a refractive index at 550 nm which is at least 2.15, and having an optical thickness $Eo_{12}$ between 10.0 and 40.0 nm.

20. The material as claimed in claim 1, wherein a ratio of the optical thickness Eo1 of said first dielectric coating M1 to the optical thickness Eo4 of said fourth dielectric coating M4 is greater than 2.0.

* * * * *